(12) United States Patent
Korner et al.

(10) Patent No.: US 6,435,057 B1
(45) Date of Patent: Aug. 20, 2002

(54) TRANSMISSION STRUCTURAL UNIT

(75) Inventors: Tillmann Korner, Zang; Achim Paul Schieder, Krummennaab, both of (DE)

(73) Assignee: Voith Turbo GmbH & Co. KG, Heidenheim (DE)

( * ) Notice: Subject to any disclaimer, the term of this patent is extended or adjusted under 35 U.S.C. 154(b) by 0 days.

(21) Appl. No.: 09/601,162

(22) PCT Filed: Dec. 1, 1999

(86) PCT No.: PCT/EP99/09319

§ 371 (c)(1),
(2), (4) Date: Aug. 16, 2000

(87) PCT Pub. No.: WO00/36319

PCT Pub. Date: Jun. 22, 2000

(30) Foreign Application Priority Data

Dec. 3, 1998 (DE) .......................................... 198 55 759

(51) Int. Cl.$^7$ ............................................... F16H 57/02
(52) U.S. Cl. ......................... 74/606 R; 74/372; 74/371
(58) Field of Search ............................. 74/606 R, 360, 74/371, 372; 475/252

(56) References Cited

U.S. PATENT DOCUMENTS

| | | | |
|---|---|---|---|
| 3,475,992 A | 11/1969 | West, Jr. et al. | 74/759 |
| 3,972,246 A | * 8/1976 | Link | 74/360 |
| 4,005,618 A | * 2/1977 | Cohen | 74/640 |
| 4,102,444 A | 7/1978 | Palme | 188/72.1 |
| 4,446,758 A | 5/1984 | Winzeler et al. | 74/781 R |
| RE32,125 E | * 4/1986 | Von Kaler et al. | 74/371 |
| 5,542,310 A | * 8/1996 | Lee | 74/372 |

OTHER PUBLICATIONS

W. Klement, "Development of the Voith–DIWA Transmission".

G. Nitescu, "Four–Speed Planetary Gearbox for Passenger Vehicles with Hydrodynamic Torque Converter as Power Dividers," Automobil–Industrie 5/85.

M. Bucksch, ZF–5–Speed Automatic Transmission for Passenger Vehicles (5HP 18).

M. Bucksch, "ZF–5–Gang–Automatgetriebe fur PKW (5HP 18)"; VDI BERICHTE NR. 878,1991, Seiten 189–200.

G. Nitescu, "Viergangplanetengetriebe fur Personenkraftwagenn mit dem hydrodynamischen Drehmomentwandler in Leistungsverzweigung"; Automobil Industrie, Nr. 1, 1985, Seiten 597–602.

W. Klement, "Die Entwicklung der Voith–DIWA–Getriebe", Verkehr und Technik, De, Eric Schmidt Verlag, Bielefeld, Bd. 40, Nr. 7, 1987, Seiten 301–303.

* cited by examiner

Primary Examiner—Vinh T. Luong
(74) Attorney, Agent, or Firm—Baker & Daniels

(57) ABSTRACT

A gear constructional unit with a gear housing is provided. In order to make the effective diameter of the inner gear elements greater, as well as to ensure a simple assembly and exchangeability of the individual gear elements, for example coupling arrangements and planetary wheel sets, there are provided at least two bar-form guide elements, which extend, as viewed in an axial direction, over at least a part of the axial extent of the cylindrical inner space, on which a large number of gear elements are mounted in fixed position with respect to the housing. The bar-form guide elements are located adjacent to the cylindrical inner space, outside of a zone having the greatest dimension of the cylindrical inner space relative to the gear housing dimension, and are arranged in recesses in the gear housing which are connected with the inner space.

17 Claims, 3 Drawing Sheets

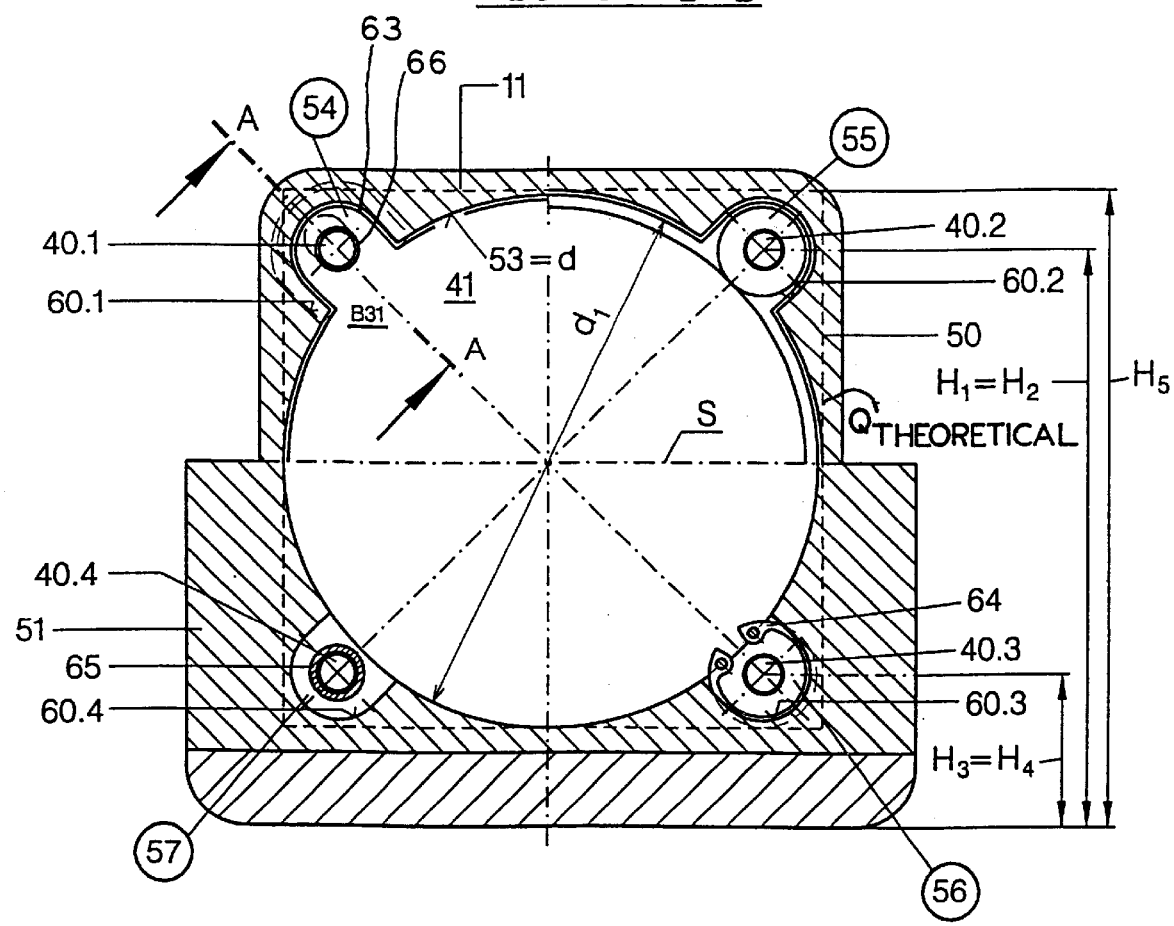

TRANSMISSION STRUCTURAL UNIT

BACKGROUND OF THE INVENTION

1. Field of the Invention

The invention relates to a gear constructional unit in particular with an essentially cylindrical interior space and bar form guide elements for mounting gear elements.

2. Description of the Related Art

Gear constructional units are known in a large number of executions. These can be executed as a) a mechanical gear component b) a hydrodynamic-mechanical compound gear component.

Hydrodynamic-mechanical compound gear components are known, for example, from the following publications:

Buksch, M: ZF five-gear automatic gears for passenger cars, VDI report 878 (1991)

Mitescko, G: Four-gear planetary gears for passenger cars with the hydrodynamic torque converter in the power branch, Automobilindustrie (1995) 5, pages 597–602

Klement, W.: The development of the DIWA gears, Verkehr und Technik (1997) 7, pages 301–303

Gear components which have either only purely mechanical transmission components or else consist of a combination of a hydrodynamic converter or of a hydrodynamic coupling with a downstream mechanical gear set, have as a rule a housing which in respect to its inner contour is adapted to the shape of the individual gear elements and to their connection to the housing and they have, as a rule, interior insets which undesirably reduce the inside diameter. For example, one known gear uses a threading of the gear elements onto six rods which are allocated to the interior space of the gear circumferentially at uniform intervals. This makes possible, to be sure, a very simple assembling of the components or gear elements, but the arrangement of the six bars in circumferential direction with constant spacing between two bars, as well as the number of these rods considerably reduces the inside diameter of the gear system, since the upper bars in installation position determine the structural height and therewith also the possible usable planetary diameter.

Underlying the invention, therefore, is the problem of creating a possibility for the formation of gear components, especially gear housings, with which in firmly prescribed installation as high as possible torques can be transmitted. In detail, there, emphasis is to be given to a reduction of the constructive and above all of the manufacturing technical expenditure as well as a minimizing of the required number of components.

BRIEF SUMMARY OF THE INVENTION

According to the invention the gear component, which comprises a gear housing and has a substantially cylindrical interior space, has at least two bar-form elements for the tying-on of gear elements in radial direction with respect to the gear axis, or in peripheral direction. The bar-form guide elements extend there essentially over a range in which there are arranged the gear elements provided for the tying-on. The bar-form guide elements are assigned to the cylindrical interior space and are arranged outside of this, in which the allocation occurs in such manner that the bar-form guide elements are provided outside of a zone which, as viewed in installation position of the gear, corresponds to the greatest dimension of the interior space in elevation direction of the gear component.

This means that none of the guide elements is arranged in installation position above the greatest dimension of the interior space in elevation direction, in the gear housing, but rather they are in the zones formerly more intensive in material for the gear housing, with an essentially quadrangular gear external contour with cylindrical interior space.

Under a further aspect of the invention there occurs there an arrangement of the bar-form guide elements with respect to the cylindrical interior space in a zone which is bounded by the installation position Under a further aspect of the invention there occurs there an arrangement of the bar-form guide elements with respect to the cylindrical interior space in a zone which is bounded by the minimal and maximal dimensions of the cylindrical interior space. This means that there does not occur an arrangement directly above the greatest dimension in elevation direction, or underneath the lowest dimension of the cylindrical interior space in elevation direction, on the symmetry line of the cylindrical interior space running in elevation direction, as viewed in installation position. This offers the advantage that the housing builds relatively in elevation direction and therefore does justice optimally to the increasingly raised demands on the utilization of the available construction space.

With the solution according to the invention, therefore, the inside diameter or the inside contour of the gear housing can be made noticeably greater with constant installation measures for the gear component. By the guidance of the bar-form guide elements in the recesses which are connected with the cylindrical interior space, the cylindrical interior space can be utilized completely by the gear elements in respect to their radial extent. For example, with execution of the gear elements as a lamellar coupling the surface describable by the cross section surface of the interior space can serve more completely as possibly usable friction surface. Since the bar-form guide elements do not collide with the interior space, the other rotating gear elements, for example planetary wheel sets, can also be laid out in such manner that the entire interior space is completely utilized in radial direction. This leads to the result that because of the diameter increase with the same construction length, a greater torque can be transferred. It is possible to dispense with additional interior insets for the bearing, which reduce the diameter of the interior space. The suspension on the, bar-form guide elements prevents a twisting of the individual gear elements in circumferential direction and, in addition, limits the movability in radial direction with respect to the gear axis.

Compulsorily required are only two bar-form elements; at most four are required and preferably four bar-form guide elements are set in. The arrangement occurs in this case, as viewed in the cross section of the gear housing, in the corners zones, which (cross section) is describable by the section amount between the cylindrical interior space and a theoretically generatable square $Q_{theoretical}$ with a side dimension greater than or equal to the diameter of the interior space, the theoretically generatable square $Q_{theoretical}$ and the interior space having identical axes of symmetry. In this case, especially with a rectangular housing with cylindrical interior space, the material-intensive corner zones are used for the reception of the guide elements. The guide elements are guided there in recesses that are connected with the cylindrical interior space. Preferably the arrangement of the guide elements, however, occurs always symmetrically. This offers the advantage that the production expenditure for the gear elements and the gear housing can be minimize, as can also the assembling expenditure, since it is not necessary to take care of how the individual recesses or the passage openings on the gear elements have to be formed for the reception of the guide elements. Furthermore, the hosing base body can be made with the recesses independently of the latter actual installation position.

As gear elements there can be regarded, for example, brake arrangements in the form of lamellar brakes, partitions, actuating elements for braking or coupling devices, for example in the form of cylinders, pistons or cylinder-piston units, lamellae carriers or the like.

The bar-form elements preferably have over their axial extent, a like or constant diameter. This offers the advantage that the assembling can take place independently from the installation direction of the bar-form elements. There is conceivable also, depending on the formation of the total gear component, the use of bar-form elements with different diameter over the axial extent. In this case, however, as a rule, an assembling will occur as a rule from two sides.

By bar-form elements there are meant there guide elements the profile of which is constructed as a solid or hollow profile, or constitutes a combination of the two.

The guide elements, further, depending on the connection, can function as shaft or axles.

It is conceivable, for example, to execute a guide element as a hollow axle which encloses, for example, a shaft for the drive of additional units or an axle.

The cross section of the bar-form guide element is preferably circular. There are conceivable, however, also executions with tetragonal cross section or arbitrary cross section.

In regard to the bearing of the bar-form guide elements the following variants can be used:
a) Bearing on the housing in housing wall projections, for example at the beginning and/or end of the housing
b) Bearing in intermediate walls, which are threaded onto the guide elements
c) Suspended bearing on a wall projection or an intermediate wall, for example on the face sides of the gear, for example over covers
d) Bearing over wall projections (lugs)

The gear component can be constructed as a purely mechanical gear component. In this case each bar-form guide element extends preferably over the entire axial extent of the gear component. In the execution of the gear component as a hydrodynamic-mechanical compound gear, the bar-form guide element is provided with an axial length which corresponds to the axial extent of the mechanical gear part, with respect to the total gear component. It is always required, however, that the axial extent of the guide elements corresponds to the axial extent of the gear element supported on this.

A further possibility for the bearing of the bar-form elements lies in using the housing cover. In the especially preferred forms of execution, however, this possibility is dispensed with, in order to keep the housing cover free from forces, especially axial forces.

In an especially preferred gear component unit devices for the resetting of actuating elements of the lamellar brake- and/or coupling-arrangements are led through the bar-form guide elements. Between the two friction surface-carrying elements which are couplable with one another indirectly by frictional closure, there is provided at least one spring storage arrangement, which is likewise led over the bar-form guide elements and is laid out in such manner that on generation of the frictional closure between the friction surface-carrying elements and the intermediate element the spring storage arrangement is pre-stressable. By friction surface carrying elements there are meant there the elements which are couplable with one another over an intermediate element. In each case a friction surface-carrying element and a friction surface-carrying intermediate element form, on pressing-on a friction surface pair. By friction surface there is meant there the surface or the surface zone which participates in the friction closure. The friction surface there can be a component of the friction surface carrying element or of the intermediate element or it can be allocated to this as a separate element, for example in the form of a covering. The friction surface or the surface zones functioning as friction surface of a friction surface-carrying element or intermediate element can be generated, further, by a coating or surface treatment. The function of friction surface-carrying elements can be taken over there both by the outer as well as also by the inner lamellae. By reason of the effect of the spring storage unit between the individual friction surface-carrying elements, on relaxation of the actuating element in each case there acts an oppositely directed force on the friction surface-carrying elements, so that a rapid separation becomes possible with complete release of the frictional closure. The spring storage arrangements, therefore act indirectly, over a friction surface-carrying element, upon the actuating element. The actuating element itself can be executed, for example, as a piston, which preferably can be acted upon hydraulically or pneumatically. This possibility of arranging the spring storage elements between the friction surface-carrying elements offers the advantage that the dimensions of the friction surface carrying elements in radial direction are no longer dependent on the size of the inner dimensions of the gear housing under consideration for the required construction space for the device, at least for the indirect resetting of the actuating elements. The arrangement of spring storage units between the friction surface-carrying elements connectable with one another over an intermediate element offers the advantage of a space-saving execution of the resetting device, especially of the piston of a cylinder/piston unit in axial direction, which again affects the gear length in use of the brake arrangements in lamellar construction in a gear. In regard to the arrangement of the spring units between the friction surface-carrying elements, a large number of possibilities are conceivable:

a) Arrangement of spring units between each of the two adjacent friction surface-carrying elements;
b) Arrangement of the spring unit in force-flow direction between the friction surface-carrying elements in the zone of the force introduction (in the zone of the in each case outside-lying friction surface-carrying elements with respect to the installation position of the braking arrangement in a gear component);
c) Arrangement of the spring unit between two friction surface-carrying elements adjacent to one another with respect to the axial extent of the braking arrangement in the middle zone of the latter;
d) Arrangement according to b) in combination with c);
e) Arrangement of spring units in correspondence to the possibilities described in a) to d);
f) Combination of e) with the possibilities a) to d).

As spring storage units there are preferably used spring elements which have a characteristic line characteristic with an essentially constant force flow over a certain spring excursion. Preferably, therefore, cup springs are used. The execution of the spring units as a shaft spring ring is likewise thinkable. The actuating arrangements can be executed as cylinder-piston arrangements, which are actable upon hydraulically or pneumatically. In correspondence to the arrangement of the piston for the resetting device over the friction surface-carrying elements, especially lamellae on the piston are active, either in the zone of the piston surface or outside of the piston surface. In regard to the formation of the piston there are distinguished executions with a) one piston
b) a plurality of pistons.

The appertaining cylinders can be formed there by a cylinder-carrying element or by a plurality of cylinder-carrying elements. This possibility for the piston resetting offers the advantage of a minimal space required in radial as well as in axial direction. In combination with the solution according to the invention there is given the possibility of creating a gear component with the possibility of high torque transmission with the structural height remaining constant, or with a reduced structural height.

BRIEF DESCRIPTION OF THE SEVERAL VIEWS OF THE DRAWINGS

The solution according to the invention is explained in the following with the aid of the figures. In these, the following is represented:

FIG. 2 is a section view of the inventive gear unit of FIG. 1a taken along line B—B of FIG. 1b.

DETAILED DESCRIPTION OF THE INVENTION

Figure 1A:
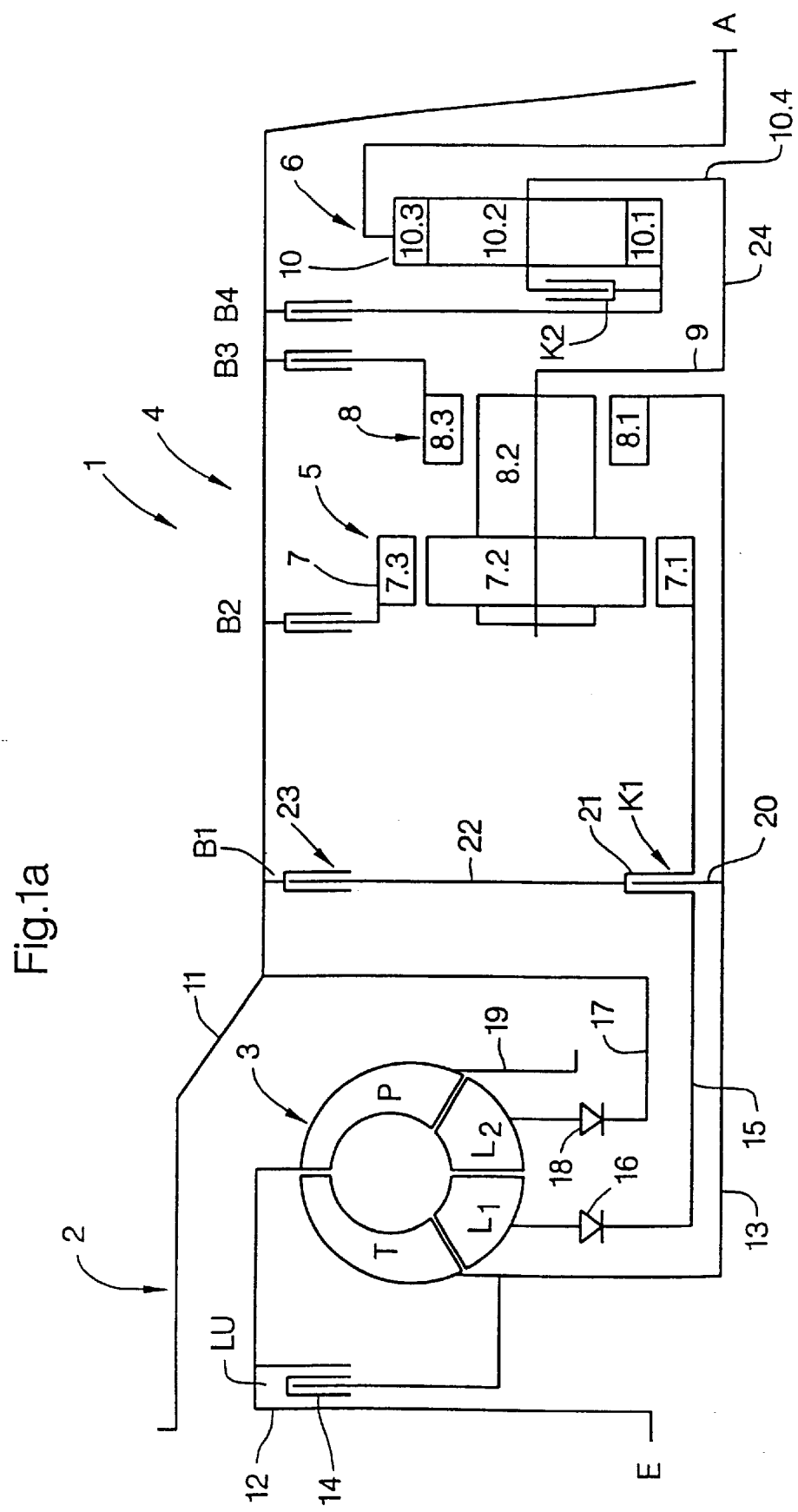
FIG. 1a is a schematic diagram of the inventive gear unit.

FIG. 1 explains the solution according to the invention by way of example, with the aid of a certain gear type in axial section. The gear construction unit is executed as hydrodynamic-mechanical compound gear 1.

The hydrodynamic-mechanical compound gear 1 comprises a first hydrodynamic gear part 2 in the form of a hydrodynamic speed/torque converter 3 and a second mechanical gear part 4. The mechanical gear part 4 comprises a mechanical speed/torque converter 5 and a group set engaged downstream to this in force flow direction. The mechanical speed/torque converter 5 is executed as a modified Ravigneaux-planetary wheel set. This comprises a first planetary wheel set 7 and a second planetary wheel set 8, which have a planetary wheel carrier 9 used in common. This establishes the coupling between a gear element of the first and of the second planetary wheel set. The first planetary wheel set 7 comprises a sun wheel 7.1, planetary wheels 7.2 and a hollow wheel 7.3. The second planetary wheel set 8 comprises a sun wheel 8.1, planetary wheels 8.2 and a hollow wheel 8.3.

The group set 6 comprises at least one planetary wheel set 10, which has a sun wheel 10.1, planetary wheels 10.2, a hollow wheel 10.3 and a web 10.4.

The hydrodynamic-mechanical speed/torque converter 3 comprises a turbine wheel T, a pump wheel P, a first guide wheel L1, and a second guide wheel L2, and it is covered by a housing 11. The pump wheel P is connected with a gear input shaft E, which is couplable at least indirectly with a drive device serving for the driving, preferably with a flywheel 12 of an internal combustion engine in such manner that the force from the flywheel 12 is transferred to the pump wheel P. The turbine wheel T is joined untwistably with a turbine wheel shaft 13. In order to use the advantages of the hydrodynamic torque transfer with bridging coupling, which in the following would be:

automatic stageless setting-in of the relation between the drive- and off-drive-speed corresponding to the load on the off-drive side
availability of the maximum torque for a starting operation with high acceleration;
possibility of head lead-off by outside or surface cooling
separation of the hydrodynamic speed/torque converter from the off-drive, especially from the vehicle at low drive speeds and transfer of a low residual torque, so that a choking of the drive device from the off-drive side is not possible
wear-free power transfer and simultaneously . . . (Sc. to avoid) the disadvantages of a hydrodynamic power transmission, which essentially has an often no sufficiently attainable efficiency, in order to be able to work with a hydrodynamic gear alone, since power loss constituents that comprise friction and impact losses reduce the transferrable total power, and the transformation ranges achieved are often insufficient for the vehicle use, the hydrodynamic speed/torque converter 3 is used only in the lower gear stages, preferably only during the starting operation, for the power transfer. For the improvement of the transmission efficiency, therefore, the hydrodynamic speed/torque converter 3 is taken out of the power transmission, preferably by bridging. For this purpose, between the turbine wheel T and the flywheel 12 or the gear input shaft there is arranged a bridging coupling 14.

The first guide wheel L1 is arranged on the turbine side between the turbine wheel T and the pump wheel P and is borne by a freewheeling. The first guide wheel L1 is untwistably connectable with a first guide wheel shaft 15, there being provided between the first guide wheel L1 and the guide wheel shaft 15 a freewheeling 16, which is laid out in such manner that it transfers a torque onto the first guide wheel shaft 15 when the first guide wheel L1 turns in opposite direction, i.e. in a rotation direction opposite that of the turbine wheel T, and which runs without load when the first guide wheel L1 rotates in normal direction, i.e. in the same direction of rotation as the turbine wheel T. The second guide wheel L2 is arranged between the turbine wheel T and the pump wheel P and is couplable, over a second guide wheel shaft 17, with the housing 11. Between the second guide wheel L2 and the second guide wheel shaft 17 there is arranged a freewheeling 18, by means of which the second guide wheel L2 can be coupled with the second guide wheel shaft 17, but only when the second guide wheel L2 rotates in a direction opposite that of the turbine wheel T.

The pump wheel P is untwistably connected with a pump wheel shaft 19, which is turnably borne over a bearing in the housing 11.

For the execution of the individual gear stages and the design of the individual gears, switching elements are allocated to the individual elements of the hydrodynamic-mechanical compound gear system 1. Between the hydrodynamic gear part 2 and the mechanical gear part 4 there are provided a first coupling arrangement K1 and a first braking arrangement B1.

The turbine wheel T and the turbine wheel shaft untwistably couplable with it, are coupled with the sun wheel 8.1 of the second planetary wheel set 8 of the mechanical speed/torque converter 5. Preferably the turbine wheel T and the sun wheel 8.1 of the second planetary wheel set 8 are arranged on a common shaft, here the turbine wheel shaft 13; the turbine wheel shaft 13 carries there also the coupling (clutch) disk 20 of the first coupling K1. The first coupling K1 has, further, a coupling disk 21, which is coupled with the first guide wheel shaft 15. Further, the first glide wheel L1 is connectable, over the first guide wheel shaft 15, with the sun wheel 7.1, of the first planetary wheel set 7 of the mechanical speed/torque converter 5. The coupling disk 21 is connected with the first guide wheel shaft 15. The first guide wheel shaft 15 is executed as a hollow shaft, which encloses the guide wheel shaft 13 in circumferential direction.

With the coupling covering 21 of the first coupling K1 there is connected a preferably disk-form element 22, and forms with this a constructive unit on the outer circumferential zone 23 of which the first braking arrangement B1 can engage. The first braking arrangement B1 serves there for the fixing into place of the first guide wheel L1 over the guide wheel shaft 15 and/or of the first sun wheel 7.1 of the first planetary wheel set 7 of the mechanical speed/torque converter 5. Further switching elements, here the switching elements in the form of braking arrangements B2 and B3 are allocated to the individual planetary wheel sets 7 and 8 of the mechanical speed/torque converter 5. In the case represented the second braking element B2 is allocated to the hollow wheel 7.3 of the first planetary wheel set 7, and the third braking element B3 is allocated to the hollow wheel 8.3 of the second planetary wheel set 8 of the mechanical speed/torque converter 5. The coupling of the mechanical speed/torque converter 5 with the gear input shaft E over the hydrodynamic speed/torque converter 3 or its bridging over the bridging coupling 14, occurs thereby by coupling of the turbine wheel T or the turbine wheel shaft 13 with a first gear element of the mechanical speed/torque converter 5 and of the first guide wheel L1 with a further second gear element of the mechanical speed/torque converter 5. As first gear element of the mechanical speed/torque converter 5 there functions here the sun wheel 8.1 of the second planetary wheel set 8. As second gear element there functions the sun wheel 7.1 of the first planetary wheel set 7. The shafts coupled with the two sun wheels 7.1 and 8.1, here the first guide wheel shaft 15 and the turbine wheel shaft 13, function as input shafts of the mechanical speed/torque converter 5. A further third gear element is connected over the group set 6 with the gears output shaft A. As third gear element there functions the planetary carrier 9, which is used in common by both planetary wheel sets 7 and 8. The third gear element of the mechanical speed/torque converter 5 is connected with the input, which is formed by a first gear element of the group set 6. Preferably this connection is realized over an untwistable coupling of the third gear element of the mechanical speed/torque converter 5 and the first gear element of the group set 6. Both are preferably arranged on a common connecting shaft 24. The first gear element of the group set 6 is formed by its planetary carrier 10.4. A second gear element of the group set 6 is untwistably joined with the gear output shaft A of the hydrodynamic-mechanical compound gear system 1. As second gear element there functions, in the case represented, the hollow wheel 10.3 of the planetary wheel set 10 of the group set 6. While the mechanical speed/torque converter 5 serves for the execution of three gear steps in combination with the hydrodynamic speed/torque converter 3, in the case represented six gear steps can be obtained by the combination of the hydrodynamic speed/torque converter 3 (and) of the mechanical speed/torque converter 5 with the group set 6. For this purpose there are allocated to the group set 6 in each case a further coupling arrangement, here the second coupling arrangement K2 and a further braking arrangement, here the fourth braking arrangement B4. The fourth braking element serves there for the fixing into position of the sun wheel 10.1 of the group set 6. The second coupling arrangement K2 makes possible the rigid coupling between the planetary carrier 10.4 and the sun wheel 10.1 of the planetary wheel set 10 of the group set 6.

Figure 1B:
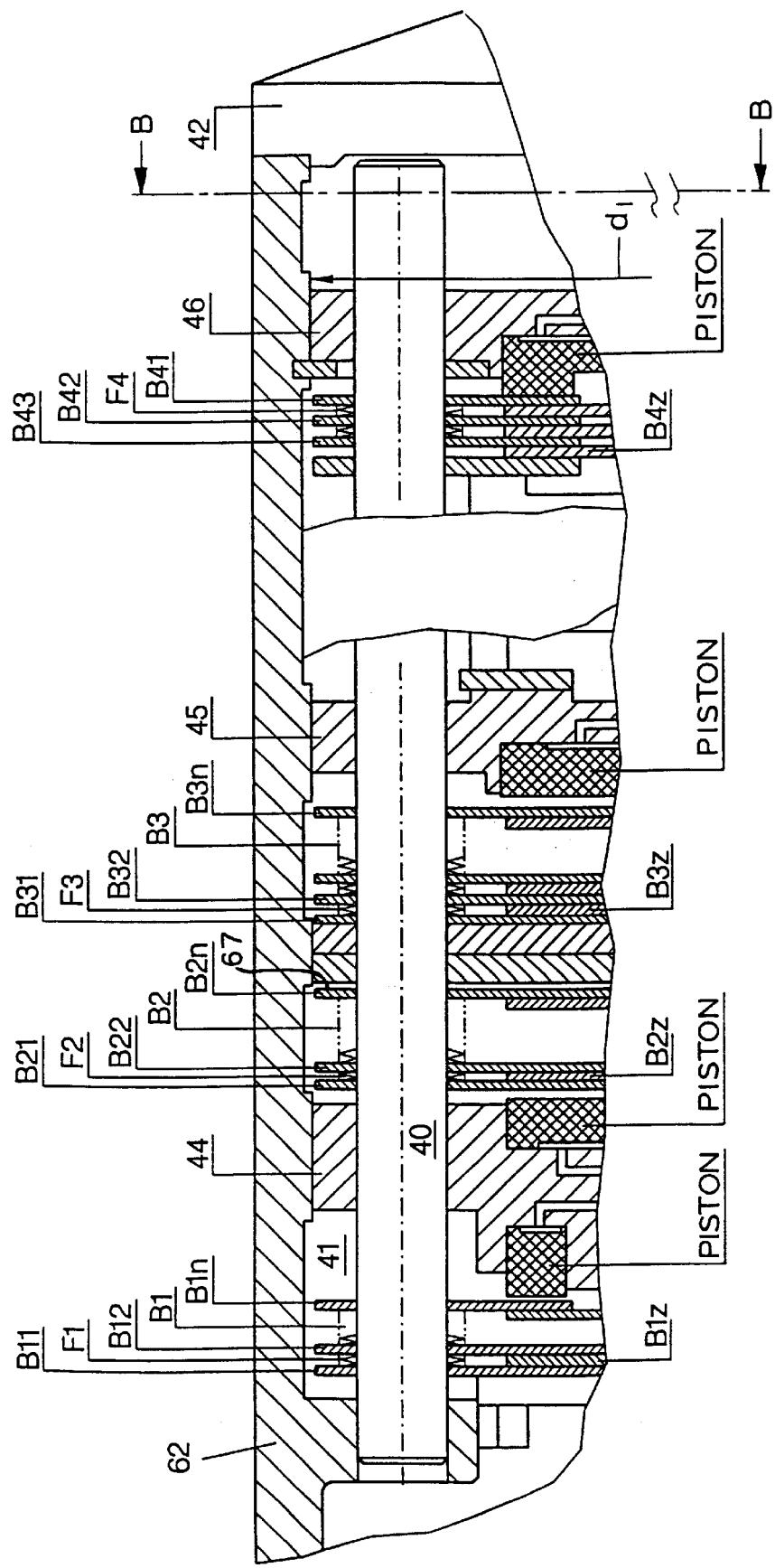
FIG. 1b is a section view of the inventive gear unit of FIG. 1a taken along line A—A of FIG. 2.

In the cut represented in FIG. 1b, from a possible axial section of the gear component 1 it is to be seen how individual gear elements which are fastened to or borne on the housing are fastened to this housing 11 in the manner of the invention. The individual braking arrangements B1 to B4 are executed in laminar construction. These comprise in each case at least two friction surface-carrying elements which are joined with one another by friction closure over a friction surface-carrying intermediate element. The friction surface-carrying elements, there, are designated as follows for the individual braking arrangements:

$B_1$: $B_{11}$, $B_{12}$, $B_{1n}$
$B_2$: $B_{21}$, $B_{22}$, $B_{2n}$
$B_3$: $B_{31}$, $B_{32}$, $B_{3n}$
$B_4$: $B_{41}$, $B_{42}$, $B_{4n}$

The intermediate elements are designated in each case with $B_{1z}$, $B_{2z}$, $B_{3z}$ and $B_{4z}$. There, the friction surface-carrying elements $B_{1n}$ to $B_{4n}$ form the outer lamellae. The fixed positioning of the outer lamellae occurs over the bar-form guide elements 40. These extend preferably at least over the axial extent of the mechanical gear part 4. The housing 11 has in this section an inside diameter 4 essentially constant over the axial extent. Preferably, as represented in FIG. 2, four bar-form guide elements 40.1 to 40.4 are provided, which are arranged, in circumferential direction in the gear housing 11, for example with constant spacing to one another. The gear housing 11 itself, for example, at least in the zone which receives the mechanical gear part 4, is formed in such manner that it has a substantially cylindrical inner cross section. Preferably the gear housing, as viewed in axial direction, has a substantially constant inside diameter in the zone of the mechanical gear part 4. The inside diameter is designed in such manner that essentially the rotating gear elements and components can rotate freely, utilizing the maximally possible construction space. The individual guide element 40 is preferably executed in one piece, but can also consist of several sections. In the unmounted state of the mechanical gear part 4, the inner part of which is designated here with 41, is essentially empty. For the assembling, first the bar-form guide elements are brought into the corresponding positions or suspended onto the gear housing in a corresponding manner, and the individual gear elements are successively threaded on these guide elements in correspondence to the desired arrangement. From the separation point T, all the components of the mechanical gear part can be threaded one after another to the housing cover 42 in the assembling. This offers the advantage that with the threading-on technique and the constant inside diameter the individual components in the mechanical gear part 4 can be exchanged among one another, and therewith in a simple manner with constant gear housing or like dimensions of the gear component intermediate off-drives, or all-wheel off-drives can be achieved. The assembling occurs only from one side and, namely, in the case represented, from the side of the cover 42. The assembling is simple in form and can be executed within the shortest time. The individual planetary wheel sets can be exchanged among one another in respect to their arrangements. Further, different off-drive variants are possible.

The axial fixing into position of the individual gear elements occurs there by security means, for example in the form of security rings 64 or stops 67. Besides the outer lamellae there are also governed so-called partitions 44, 45, 46 and 47. Further there occurs, likewise over the guide elements 40.1 to 40.4, the fixed arrangement or supporting of gear elements, for example lamellae carriers or the like.

FIG. 2 explains a cross section corresponding to a view A—A according to FIG. 1. There is evident the gear housing 11, which can be subdivided in the case represented into two partial zones 50 and 51. The first partial zone 50 forms there in installation position the upper housing part, the second partial zone forms the housing part arranged underneath the gear symmetry axis S in installation position. The gear housing 11 has, as already explained in the statements for FIG. 1, a substantially cylindrical inner contour 53, which encloses an interior space 41. The inner contour 53 can be described by the diameter $d_1$. This extends as already thoroughly explained in the statements for FIG. 1, essentially over the entire axial extent of the mechanical gear part 4.

Means are provided for the reception and binding-on of the gear elements in radial direction, and for the security with respect to twisting in circumferential direction. These means are formed by the guide elements 40.1 to 40.4. These are allocated to the inner circumference 53 described by the diameter $d_1$ in such manner that these in installation position of the gear unit 1, are arranged at a height H1 to H4 which, in respect to the dimensions, is less than the dimension H5 described by the maximal extent of the inner contour 53 in installation position in elevation direction. The guide elements, therefore, as explained in FIG. 2, are arranged in the corner zones 54, 55, 56 and 57 of the housing 11, the corner zones so that they make it possible to describe an allocation of a quadrate or rectangle to the inner contour 53. The corner zones 54 to 57 are described there in installation by allocation of the quadrate (square) $Q_{theoretical}$ in which the diameter $d_1$ circumscribed by the inner contour is arranged in the quadrate and both, the theoretical quadrate $Q_{theoretical}$ cited for consideration, as well as the inner diameter d of the inner contour 53 of the housing, have the same symmetry axes S1 and S2, respectively.

For the reception of the guide elements, corresponding recesses are provided in the housing. These are designated here in each case with 60.1 to 60.4 for the individual guide elements. The arrangement of these recesses 60.1 to 60.4 in the housing occurs there outside of a range on the gear housing which is described by, the respective symmetry of the gear component axis in elevational and in width direction, respectively, i.e, with use of a substantially rectangular housing outer form and an essentially cylindrical housing inner contour 53, only the material-intensive corner zones 54 to 57 of the housing 11 are used for the reception of the guide elements 40.1 to 40.4. Additional construction space in elevational or width direction is not needed. The interior space 41 can be formed with the maximally possible diameter $d_1$, since in height and width directions no additional construction space has to be provided for the tying-on of the gear elements. The gear housing 11 itself can be equipped with a relatively thin housing wall in the zones free from the worked-in recesses 60.1 to 60.4.

The recesses 60.1 to 60.3 form so-called engagement pockets into which the guide elements 40.1 to 40.4 can be inserted. Preferably in each case in axial direction, as explained in FIG. 1, there is provided a possibility for the suspension or for the floating bearing of the guide elements 40.1 to 40.4. This is designated in FIG. 1 with 62. In addition, the guide elements can also be guided in the partitions which extend over the entire interior space in radial direction. FIG. 2 explains, for example, the tying-on of the friction surface-carrying element $B_{31}$. For the attaching to the guide elements 40.1 to 40.4, in FIG. 2 four possible variants of execution are represented, schematically simplified. Preferably for the axial fixing into position of an elements there are used equal axial security elements. On the guide element 40.1 the axial securing occurs by use of shims, in the guide element 40.3 by means of a security ring 64 and on the guide element 40.4 by sleeves 65.

For the threading of the individual gear elements onto the bar-form guide elements 40.1 to 40.4, the individual gear elements have corresponding passage openings 66. Preferably the gear elements are constructed in such manner that these have projections 63 in addition to their circular cross section, on which projections there are also recesses or passage openings 66. This offers the advantage that the remaining construction space, especially the cylindrical interior space 41 can be, essentially fully utilized and contains no additional troublesome elements. Especially in the attaching of the outer lamellae in correspondence to FIG. 2, for the force transfer a surface can be used which corresponds essentially to the surface describable by the inner diameter $d_1$.

Preferably the attaching of the gear elements occurs in all four possible corner zones 54 to 57. The guide elements 40.1 to 40.4 and the corresponding projections on the gear elements are arranged with constance spacing viewed in circumferential direction with respect to the inner contour 53 of the gear component 1. There exists, however, also the possibility of finding a substantially symmetrical arrangement which differs from the arrangement in the corner zone. Further, it is not compulsorily necessary to perform an attachment in all four corner zones. For the twist safeguarding in circumferential direction at least two guide elements are required.

Preferably the braking arrangements B1 to B4 are equipped with a device for the resetting of actuating elements. For this purpose, between in each case two friction surface-carrying elements adjacent to one another, a spring storage unit is provided which according to FIG. 1 is likewise guided by the guide elements, to the guide element 40.1, and (which) is pre-tensionable, on generation of the frictional closure between the friction surface-carrying elements and the intermediate element. In the case represented, between the friction surface-carrying elements of the braking arrangement $B_1$, there are provided a spring storage unit $F_1$ or $B_2$, $F_2$, $B_3$–$F_3$ and $B_4$, $F_4$, respectively. The spring storage units there are always arranged outside of the friction surface-carrying intermediate elements, so that in this respect no collision of any kind can arise between the spring storage units and the friction surface-carrying intermediate elements. Preferably at least between the first two friction surface-carrying elements adjacent to one another in force flow direction of a braking arrangement, corresponding spring storage arrangements are arranged. This execution offers the advantage that by reason of the action of the spring storage unit, between the individual friction surface-carrying elements forces directed oppositely to these act in each case, so that a rapid separation becomes possible with complete dissolving of the friction closure. The spring storage arrangement acts, therefore, at least indirectly over the friction surface-carrying elements on the actuating element, in particular (on) a piston. The actuating elements, i.e. the pistons, can be acted upon, for example, hydraulically or pneumatically. The individual friction surface-carrying elements and the intermediate elements then no longer have to become released (sich freikleiden). There always occurs a forced separation by compulsion, at least in the zone in which the spring storage element is arranged.

The arrangement of the spring storage units between the individual friction surface-carrying elements offers, further, the advantage that the dimensions of the friction surface-carrying elements in radial direction are no longer dependent, because of the size of the interior dimensions of the gear housing under consideration, on the requisite construction space of the device for the at least indirect resetting of actuating elements. The arrangement of the spring storage units between the friction surface-carrying elements, connectable with one another under friction closure over an intermediate element offers, further, the advantage of a space-saving execution of the resetting device in axial direction, which again has a positive effect on the gear construction length.

The solution according to the invention is not restricted to one gear type as described in FIG. 1, but for this type of gears it offers an especially advantageous possibility of assembling, which also by reason of the exchangeability of individual gear elements as viewed in axial direction, results in a universal usability of a certain basic gear type.

What is claimed is:

1. A gear constructional unit comprising:
    a gear housing having a cylindrical interior space for the reception of individual gear elements; and
    at least two bar-form guide elements which extend, as viewed in an axial direction, over at least a part of the axial extent of said cylindrical interior space, said guide elements having thereon bearings for a plurality of gear elements arranged in fixed position with respect to said housing;
    said bar-form guide elements disposed in a space outside of a zone of the greatest height dimension of said cylindrical interior space, as viewed when oriented for installation;
    said bar-form guide elements being arranged in recesses in said gear housing which are connected with said interior space.

2. The gear constructional unit according to claim 1, wherein said bar-form guide elements are disposed in a zone which is bounded by the least and the greatest height dimensions of the cylindrical interior space, as viewed when oriented for installation.

3. The gear constructional unit according to claim 1, wherein said gear housing circumscribes a rectangular form and said bar-form guide elements are located in corner zones which are defined by the sections between said interior space and a theoretically constructed quadrate having side dimensions greater than or equal to the diameter of said interior space, said theoretically constructed quadrate and said interior space having identical axes of symmetry.

4. The gear constructional unit according to claim 3, wherein said bar-form guide elements are arranged in all four corner zones and have circumferentially equal spacing.

5. The gear constructional unit according to claim 1, wherein said individual gear elements guided on said bar-form guide elements include projections having passage openings for the reception of said bar-form element, said passage opening formed in such manner that said projections are received by said recesses in said gear housing.

6. The gear constructional unit according to claim 1, further comprising means which limit the movement of said gear elements in an axial direction.

7. The gear constructional unit according to claim 6, wherein said means comprise security-rings.

8. The gear constructional unit according to claim 5, wherein said means comprise sleeve-form elements.

9. The gear constructional unit according to claim 5, wherein said means comprise stop surfaces formed by said individual gear elements.

10. The gear constructional unit according to claim 1, wherein said inside diameter of said cylindrical interior space is constant over at least a portion of the axial extent of said cylindrical interior space.

11. The gear constructional unit according to claim 1, further comprising:
    a mechanical gear part; and
    a hydrodynamic gear part;
    wherein said cylindrical interior space of said gear housing has a constant diameter as viewed in an axial direction at least over the range of said mechanical gear part.

12. The gear constructional unit according to claim 1, wherein:
    at least one gear element forms a partition; and
    said bar-form guide elements are mounted in said partitions.

13. The gear constructional unit according to claim 1, wherein at least one bar-form guide element is mounted such that it is suspended at least in said gear housing.

14. The gear constructional unit according to claim 1, further comprising:
    at least one gear element in the form of a lamellar braking arrangement, comprising at least two friction surface-carrying elements, said friction surfaces compressed by one another through a further friction surface-carrying intermediate element; and
    at least one spring storage unit between two adjacent friction surface-carrying elements, said spring storage unit guided by said bar-form guide elements, and upon generation of the frictional closure said spring storage unit is preloaded between said friction surface-carrying elements and said intermediate element.

15. The gear constructional unit according to claim 1, wherein said bar-form guide element is a solid element.

16. The gear constructional unit according to claim 1, wherein said bar-form guide element has at least a portion that is hollow.

17. The gear constructional unit according to claim 1, wherein said bar-form guide elements function as axles.

* * * * *